United States Patent [19]

Sakamaki

[11] 4,121,838
[45] Oct. 24, 1978

[54] SHAFT SEAL STRUCTURE

[75] Inventor: Hiroshi Sakamaki, Utsunomiya, Japan

[73] Assignee: Nippon Piston Ring Co., Ltd., Tokyo, Japan

[21] Appl. No.: 647,482

[22] Filed: Jan. 8, 1976

Related U.S. Application Data

[63] Continuation-in-part of Ser. No. 524,908, Nov. 18, 1974, abandoned.

[30] Foreign Application Priority Data

Nov. 17, 1973 [JP] Japan .................. 48-128794

[51] Int. Cl.$^2$ .............................................. F16J 9/02
[52] U.S. Cl. ...................................... 277/176; 277/194
[58] Field of Search ................. 277/176, 177, 24, 168, 277/193, 197, 194

[56] References Cited

U.S. PATENT DOCUMENTS

| 1,370,771 | 3/1921 | Wilson | 277/176 |
| 3,266,810 | 8/1966 | Reeser | 277/24 |
| 3,397,893 | 8/1968 | Kampert | 277/24 |
| 3,912,428 | 10/1975 | Chiba et al. | 277/193 X |

Primary Examiner—Richard E. Aegerter
Assistant Examiner—L. Footland
Attorney, Agent, or Firm—Sughrue, Rothwell, Mion, Zinn and Macpeak

[57] ABSTRACT

A shaft coaxially mounted within a cylinder is sealed with respect to that cylinder by means of an annular carrier affixed to the shaft and having its periphery facing the inner wall of the cylinder provided with an annular seal groove having an inverted L-shaped cross section and receiving two circumferentially split, radially expandable seal rings, one of which is rectangular in cross section and another of correspondingly inverted L-shaped configuration, with the L-shaped seal ring having its sliding surface facing the cylinder inclined toward a radial side face thereof at an angle equal to or greater than the angular deflection of the sliding surface towards the inner wall of the cylinder due to the deflection of the seal ring about a circular line extending through the body of the L-shaped seal ring and defining a plane perpendicular to the axis of that seal ring, said deflection occurring as a result of resilient radial expansion and applied fluid pressure on the seal.

1 Claim, 6 Drawing Figures $\theta' \cong \theta$

SHAFT SEAL STRUCTURE

BACKGROUND OF THE INVENTION

1. Field of the Invention

The present invention relates to a shaft seal structure for providing a sealing effect between relatively movable mechanical elements such as a reciprocating or rotating shaft and a casing or cylinder concentrically receiving said shaft so as to avoid the possibility of fluid leakage therebetween.

2. Description of the Prior Art

A prototype shaft seal structure will be explained by way of example with reference to FIGS. 1 and 2. In a shaft seal structure widely used, an annular seal groove 3 of rectangular configuration is formed on the outer periphery 21 of a carrier 2 and a pair of seal rings 4 of rectangular cross section are carried therein in side-by-side fashion, each of which is normally formed with a circumferential gap to permit the rings to be radially expandable to sealably engage their peripheries against the cylinder.

In the conventional shaft seal structure described above, however, the sealing operation is effected at two positions, namely between the outer peripheral surfaces 41 of both seal rings and the inner wall 51 of cylinder 5 and between a radial wall 31 of the annular seal groove 3 and one of the radial, side faces 42 of one of the seal rings 4. Thus, the resultant sealing performance of conventional shaft seal structures is not completely satisfactory and such being the case, it has been earnestly desired to develop a shaft seal structure capable of enjoying a more satisfactory sealing performance.

SUMMARY OF THE INVENTION

It is, therefore, a major object of the present invention to provide a shaft seal structure capable of sufficiently satisfying the sealing requirements for a shaft which moves relative to a cylinder or casing within which it is coaxially mounted.

Additional objects other than those stated will become apparent upon consideration of the accompanying drawings and when considered in conjunction with the specification and claim.

The present invention is directed to an improved shaft seal structure for a shaft which is coaxially mounted within a cylinder and movable relative to the cylinder, and wherein the shaft includes an annular carrier fixedly mounted to the shaft with its outer periphery adjacent to and facing the inner wall of the cylinder and being subjected on one end to a pressurized fluid medium within the cylinder. The improvement comprises the provision of an annular seal groove of inverted L-shaped cross section extending circumferentially within the carrier on its outer periphery and being comprised of a base portion extending axially toward the end of the annular carrier subjected to the pressurized fluid medium and a radially inward extension portion defining axially opposed radial sidewalls, a first expandable seal ring of rectangular cross section positioned within the annular seal groove to the side of said groove remote from said pressurized fluid medium, with its periphery contacting said inner wall of said cylinder, and a second seal ring of inverted L-shaped cross section positioned within said groove adjacent the first seal ring with the second seal ring including a base portion carried within the base portion of the annular seal groove and a radially inward portion projecting within the radial extension portion of said inverted L-shaped cross sectional groove and being provided with a peripheral sliding surface facing the inner wall of the cylinder and sliding thereon and inclined toward a normal side face thereof which faces a radial side face of said first seal ring at an angle at least equal to the angular deflection of the sliding surface toward the inner wall of the cylinder due to deflection of the seal ring during radial expansion of the L-shaped seal ring under application of the pressurized fluid medium such that the inclined sliding surface of said inverted L-shaped seal ring is pressed into sliding contact with the inner wall of the cylinder and the radial projecting portion of said inverted L-shaped annular seal ring is pressed on opposite sides respectively against a radial sidewall of said inverted L-shaped groove and a radial side face of said first seal ring to reliably block fluid passage past said shaft seal structure.

DESCRIPTION OF THE PREFERRED EMBODIMENT

Figure 1:
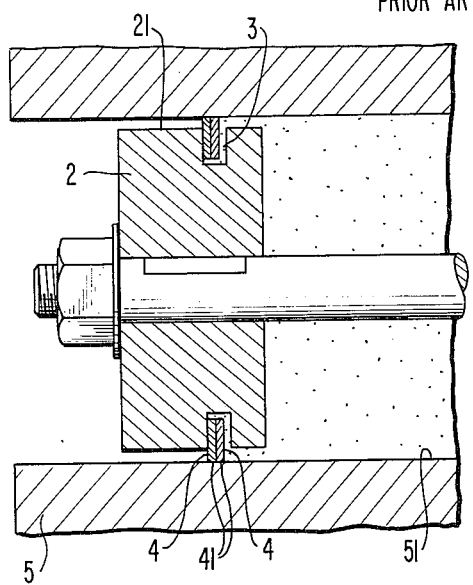
FIG. 1 is a longitudinal section of a prior art seal structure.
Figure 2:
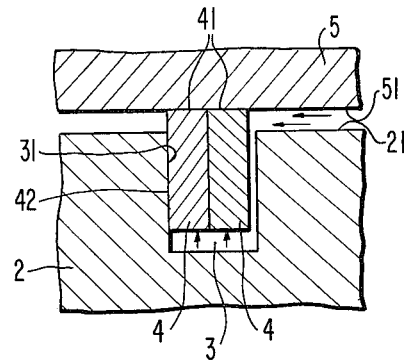
FIG. 2 is an enlarged longitudinal section of a portion of the seal structure of FIG. 1.
Figure 3:
FIG. 3 is a longitudinal section of a rectangular seal ring employed in the shaft seal structure in accordance with the present invention.
Figure 4:
FIG. 4 is a longitudinal section of a second seal ring also employed in the shaft seal structure of the present invention.
Figure 5:
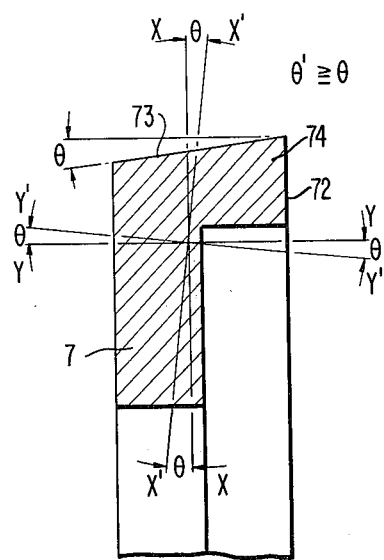
FIG. 5 is an enlarged longitudinal section of a portion of the seal ring of FIG. 4 showing the nature of flexure of the ring under applied fluid pressure.
Figure 6:
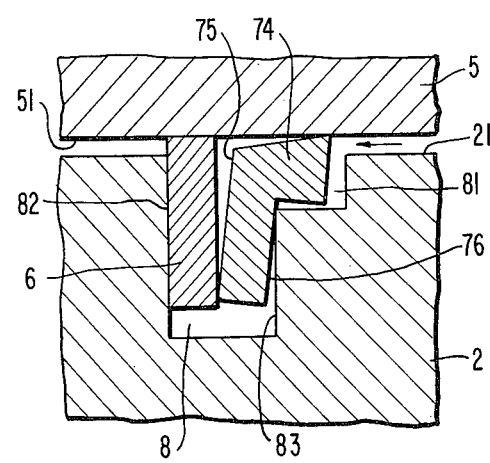
FIG. 6 is an enlarged section of a portion of a shaft seal structure in accordance with the present invention under the application of fluid pressure.

With reference to FIGS. 3–6 inclusive, the shaft seal structure of the present invention employs two seal rings, a first seal ring 6 of rectangular cross section as seen in FIG. 3 having a circumferential gap to permit compression and expansion of the seal ring, while in FIG. 4 a second seal ring 7 is employed having a cross section which is of inverted L-shape and which is also provided with a circumferential gap such that it may be elastically compressed and which, during expansion, in similar fashion to the first annular seal ring 6 causes its outer periphery to engage the inner wall 51 of a cylinder or casing 5 within which the shaft (not shown) is mounted. The shaft carries an annular carrier 2' fixed thereto in the manner of FIG. 1 but modified in accordance with FIG. 6. In that respect, the carrier 2' is provided with an annular seal groove 8 of inverted L-shaped cross section including an axially extending base portion 81 adjacent the periphery 21 of carrier 2' and having a radially inward groove protion 87 extending therefrom and defining axially opposed, radial sidewalls 82 and 83. The axial length of groove portion 87 is slightly greater than the combined thickness of rings 6 and 8 and the radially inward projecting portion 75 of the inverted L-shaped second seal ring 7 which is integral with base portion 74 of that ring. The base portion 74 of the ring is formed on its periphery with a sliding surface 73 which is inclined at an angle $\theta'$ which is equal to or greater than the angular deflection $\theta$ of the second seal ring 7 about a circular line L, FIG. 5, passing through the body of the ring, which defines a plane perpendicular to the axis of the ring during radial expansion of the ring and under the application of fluid pressure during its performance as one seal member. Under applied fluid pressure, as evidenced by arrow P, FIG. 6, the second seal ring 7 is deformed into conical shape such that the peripheral sliding surface 73 of ring 7 moves towards the inner wall 51 of casing 5. If the angle of inclination $\theta'$ is equal to the angular defelction $\theta$ shown by the shift of the X and Y planes to X' and Y' respectively, the full sliding surface 73 contacts the inner wall 51 of the cylinder 5. If the angle $\theta'$ is greater than the angle $\theta$ as shown, contact is made between the seal ring 7 at edge 7b and the inner wall 51 of the cylinder while simultaneously, the radial side face 75 of ring 7 contacts the radial side face 86 of ring 6 at edge 7a, while side face 76 of the radial projecting portion 77 of ring 7 makes contact with edge 84 of the radial sidewall 83 of groove portion 87. Due to the configuration of the second seal ring 7, there is an initial tendency of the ring to deform during its elastic expansion to the configuration shown in FIG. 6 which tendency and deflection to the full extend of the angle $\theta$, FIG. 5, occurs under the application of fluid pressure when applied in the direction of arrow P. This is true whether the shaft and its carrier 2' rotate relative to the fixed cylinder 5 or move axially in case where the shaft reciprocates. Thus, when the carrier 2' is subsequently inserted into the cylnder 5, the shaft seal structure of the present invention exhibits a marked sealing effect.

Incidentally, making the rectangular seal ring and inverted or L-shaped seal ring 6 and 7 of a synthetic resin tends to reduce the wear of the casing or cylinder inner wall and of the two seal rings themselves. The rings may also be formed of metal, as shown.

If desired, moreover, a known rotation preventive mechanism may be used with the inverted L-shaped seal ring and the rectangular seal ring.

Further, while in the illustrated embodiment, the inverted L-shaped seal ring is arranged at the same side as the working fluid which may be either gas or liquid, it will be quite understandable that substantially the same resultant sealing effects may be obtained even where the seal rings are reversed and the rectangular seal ring 6 is closest to the side of applied fluid pressure.

With these structural arrangements in mind, the actual use of the shaft seal structure of the present invention is readily accomplished by the act of inserting the carrier into the cylinder after first installing the rectangular seal ring 6 in the inverted L-shaped seal ring within its inverted L-shaped seal groove formed on the carrier. During expansion of the rings such that the peripheries of the rings contact the inner wall 51 of the casing or cylinder 5, contact of edge 7b with the inner wall 51 of cylinder 5 causes due to the elasticity of the ring a torsion or twisting effect about annular line L, such that the rectangular seal ring 6 is thrust against radial sidewall 82 of the L-shaped seal groove and at the same time edge 7a of ring 7 contacts the opposite radial side face 86 of rectangular seal ring 6, while radial side face 76 of the radial projecting portion 77 of the second seal ring 7 contacts edge 84 of carrier 2' at the radially outer end of the groove sidewall 83. Sealing contact at these points and along these surfaces is enhanced by the application of fluid pressure as evidenced by arrow P, FIG. 6, and the shaft seal structure of the present invention adequately seals the shaft and carrier 2 relative to casing or cylinder 5 to prevent any fluid leakage past the sealing rings 6 and 7 regardless of whether the shaft and carrier rotate or reciprocate with respect to the relatively fixed casing or cylinder 5.

Moreover, since the sliding surface 73 of the inverted L-shaped seal ring is inclined at an angle corresponding to the deflection or twist angle $\theta$ of the particular seal ring or at an angle larger than that, preferably the complete surface or its edge 7b at radial side wall 72 of the base portion 74 of the inverted L-shaped seal ring is brought into sliding contact with the inner wall 51 of the cylinder 5 to facilitate and reliably block fluid leakage at this point.

The present invention is described in detail in the specification with particular reference to a preferred embodiment, but it will be understood that various modifications as described hereinabove and defined in the appended claims may be made without departing from the spirit of the invention.

What is claimed is:

1. In an improved shaft seal structure for a shaft coaxially mounted within a cylinder and movable relative to the cylinder, and wherein the shaft includes an annular carrier fixedly mounted to the shaft with its outer periphery spaced from and facing the inner wall of the cylinder and being subjected on one end to a pressurized fluid medium within the cylinder, the improvement comprising:

an annular seal groove of inverted L-shaped cross section extending circumferentially within the carrier on its outer periphery, said groove comprising a base portion extending axially towards one end of the annular carrier and an axially narrower, radially inward extension portion defining axially opposed radial sidewalls, a first, radially expandable seal ring of rectangular cross section positioned within the annular seal groove with its periphery contacting the inner wall of said cylinder, a second radially expandable seal ring of inverted L-shaped cross section complementary with that of said groove and positioned within said groove adjacent said first seal ring with said second seal ring including a base portion carrier within the base portion of the annular seal groove and a radially inwardly projecting portion positioned within the radial extension portion of said inverted L-shaped cross sectional grove, said second seal ring being provided with a peripheral sliding surface facing the inner wall of the cylinder and sliding thereon, said sliding surface being inclined toward a normal side face of said second seal ring which faces the radial side face of said adjacently positioned first seal ring, at an angle at least equal to the angular deflection of the sliding surface towards the inner wall of the cylinder due to deflection of the seal ring about its circumference during seal ring radial expansion and under applied fluid pressure such that the inclinded sliding surface of said inverted L-shaped seal ring is pressed into sliding contact with the inner wall of the cylinder and the radial projecting portion of said inverted L-shaped annular seal ring is pressed on opposite sides respectively against a radial side wall of said inverted L-shaped groove and a radial side face of said first seal ring to reliably block fluid passage past said shaft seal structure.

* * * * *